Figure 4:
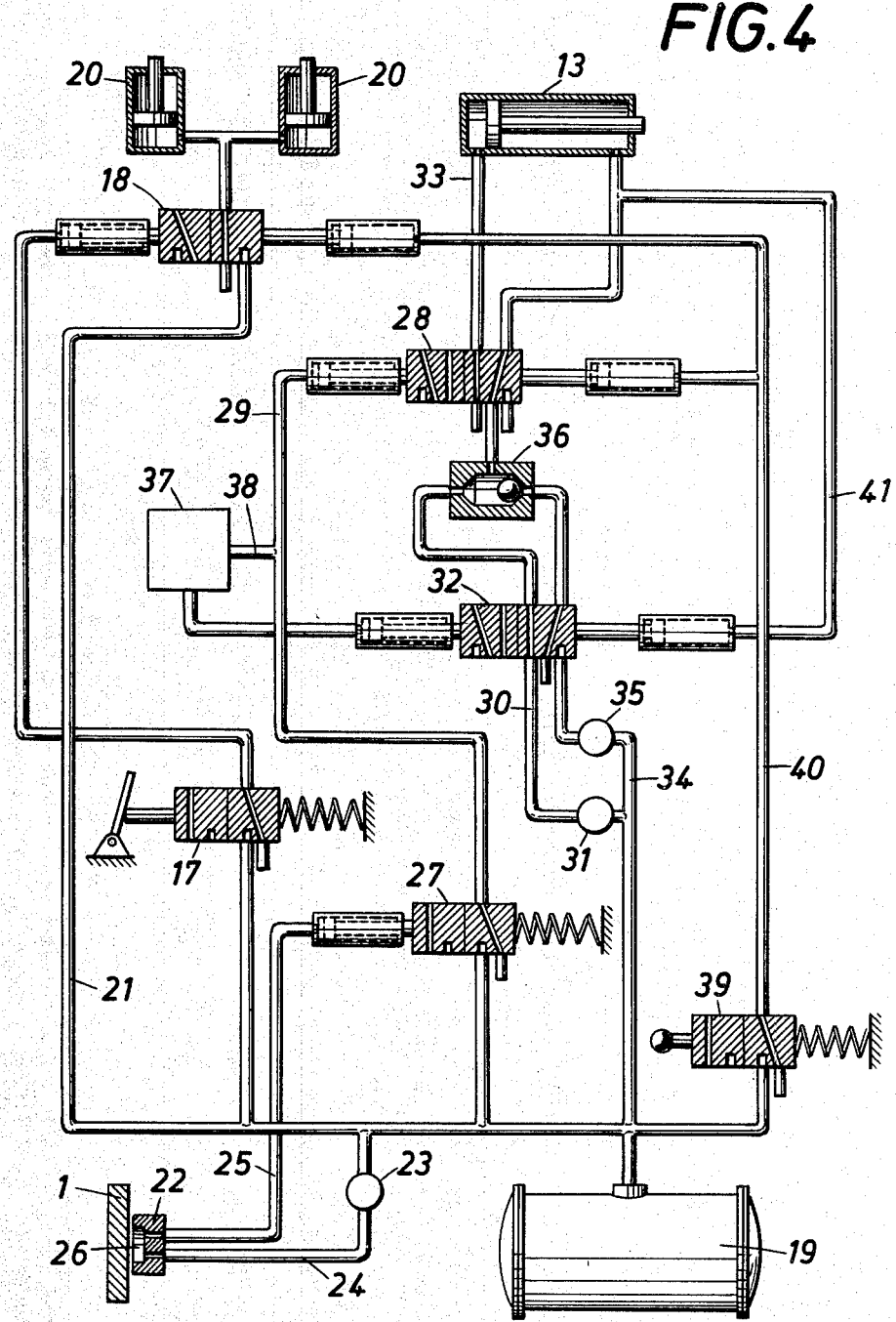

United States Patent [19]
Gärtner

[11] 4,318,879
[45] Mar. 9, 1982

[54] MOLDING WORKPIECES COMPRISING A METAL CORE EMBEDDED IN PLASTIC MATERIAL

[75] Inventor: Johann Gärtner, Leonding, Austria

[73] Assignee: Silhouette-Modellbrillen Frabrikationsgesellschaft m.b.H., Linz, Austria

[21] Appl. No.: 211,106

[22] Filed: Nov. 28, 1980

[30] Foreign Application Priority Data

Dec. 13, 1979 [AT] Austria ................................ 7856/79

[51] Int. Cl.³ .............................................. B29C 6/02
[52] U.S. Cl. .................................... 264/163; 29/20; 29/413; 29/426.5; 29/527.1; 264/275; 264/276; 264/278
[58] Field of Search ............... 264/275, 276, 278, 138, 264/163, 247; 29/413, 426.5, 527.1, 20

[56] References Cited
U.S. PATENT DOCUMENTS

| | | | |
|---|---|---|---|
| 2,197,465 | 4/1940 | Brunetti | 264/275 |
| 3,312,767 | 4/1967 | Morin | 264/275 |
| 3,363,040 | 1/1968 | Aoki | 264/278 |
| 3,392,225 | 7/1968 | Phelan | 264/278 |
| 3,814,777 | 6/1974 | Schmidt | 264/278 |

*Primary Examiner*—James B. Lowe
*Attorney, Agent, or Firm*—Kurt Kelman

[57] ABSTRACT

In the manufacture of eyeglass bows, a metal core (2) is placed in a mold (1) and is gripped at one end (3) before the mold (1) is filled with plastic material.

To ensure that the metal core (2) can be held in position in the mold (1) as the plastic charge enters, the metal core (2) at that end thereof which is opposite to its gripped end (3) is joined to a tensile element (6), which extends out of the mold. The joint between the tensile element (6) and the metal core (2) forms a rated breaking point having a limited ultimate tensile strength. Before the mold (1) has been completely filled with plastic charge, a tensile stress in excess of the ultimate tensile strength of the joint is applied to the latter by the tensile element (6) so that the tensile element will be severed and pulled out of the mold (1).

6 Claims, 4 Drawing Figures

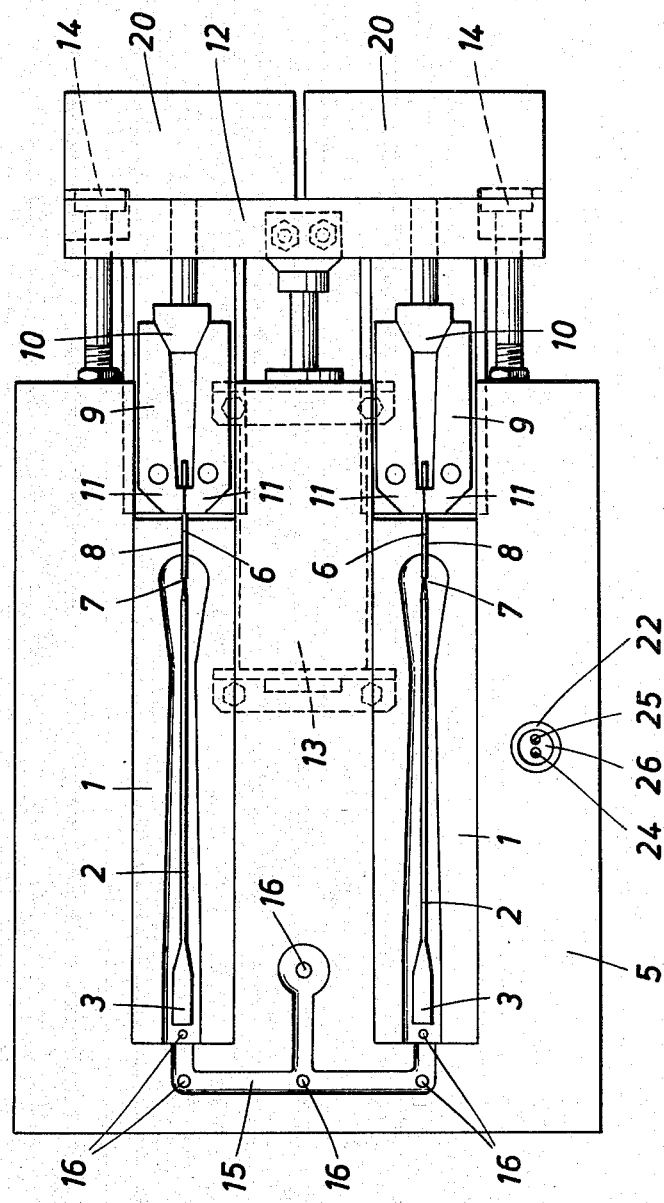

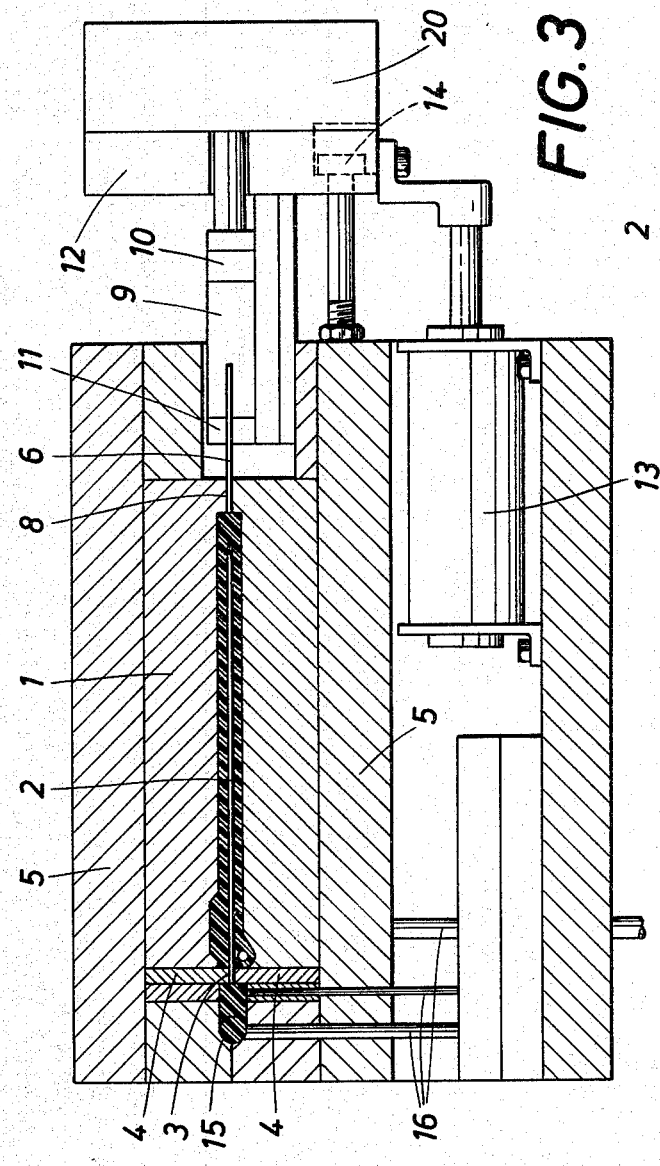

MOLDING WORKPIECES COMPRISING A METAL CORE EMBEDDED IN PLASTIC MATERIAL

This invention relates to a process of manufacturing workpieces, particularly eyeglass bows, made of plastic material and having a metal core which is placed in a mold and gripped at one end.

In the manufacture of eyeglass bows and of other workpieces having a flexible metal core which does not protrude from the plastic material at both ends, it is difficult to hold the metal core, which is gripped at one end, in the desired position in the mold as the latter is filled with the plastic charge. These difficulties are due to the fact that the metal core is not rigid and is displaced from its desired position by the plastic composition entering the mold. Whereas injection molding is the preferred technology for the manufacture of eyeglass bows, the difficulties explained above have prevented the success of the practice to embed the metal core in the plastic material by injection molding. In order to hold the metal core in the mold in the desired position, expensive measures must be adopted and even they do not give satisfactory results. For instance, it is known to mount the metal core in a track recessed in a slider, which is displaced by the plastic charge as it enters the mold. That known process has the disadvantage that it can be used only to make workpieces which agree in cross-section to the contour of the slider so that the final workpiece must generally be made from the resulting blank by milling or stamping operations.

It is an object of the invention so to improve a process of the kind described first hereinbefore that the metal core can be retained in its desired position in the mold as the latter is entered by the plastic charge and that this is ensured regardless of the configuration of the mold or workpiece so that a subsequent machining of the workpiece removed from the mold is not required.

This object is accomplished according to the invention in that the metal core is joined at a portion which is opposite to the gripped end by a joint which constitutes a rated breaking point to at least one tensile element, which extends out of the mold, the metal core is subjected to a tensile stress which is lower than the ultimate tensile strength of the joint as the plastic charge enters the mold, and the tensile stress applied is increased above the ultimate tensile strength of the joint and the severed tensile element is pulled out the mold before the mold has been completely filled with plastic material.

Because the metal core is joined to a tensile element which extends out of the mold, the metal core can be retained in the mold in the desired position by the application of the required tensile stress without a need for supporting the metal core relative to the mold wall. As a result, the metal core is reliably held in position regardless of the configuration of the mold. But the tensile element must not remain in the plastic charge with the metal core but is pulled out of the mold before the latter is completely filled with the plastic charge. For this purpose the joint between the tensile element and the metal core constitutes a rated breaking point, which has a limited ultimate tensile strength so that the application of a tensile stress in excess of the ultimate tensile strength of the joint will sever the joint between the tensile element and the metal core at the rated breaking point. This fact enables a separation of the tensile element from the metal core in a simple manner without a need for an action from the outside into the interior of the mold and without a dislocation of the metal core. All that is necessary to sufficiently increase the tensile stress applied by the tensile element so that the joint between the tensile element and the metal insert is separated at the rated breaking point and the tensile element can be pulled out of the mold. In that case the plastic charge following up will completely fill the mold because there is no longer a risk of a dislocation of the metal core, which has already been enclosed and is retained by the plastic charge that has entered the mold.

It will obviously be possible to connect the tensile element to the metal core by a clamped joint, adhesive joint or welded joint. Particularly where wire- or rod-shaped metal cores are used, a simple manufacture will be obtained if the tensile element is integrally joined to the metal core by a weak portion because in that case the metal core can be made together with the tensile element. To prevent a dislocation of the metal core as the plastic charge is injected or poured into the mold, it is obviously necessary to apply to the metal core a certain tensile stress, which will not sever the joint. For this reason there is a certain lower limit to the ultimate tensile strength of the joint between the tensile element and the metal core. An ultimate tensile strength above such lower limit can be ensured most simply if the weak point between the tensile element and the metal core is constituted by a constriction. This affords the additional advantage that the metal core has a substantially predetermined shape at its severed end when the tensile element has been removed.

Instead of a constricted portion, the weak portion may consist, e.g., of a soft annealed portion because soft annealing will also decrease the strength. On the other hand, it will be more difficult to ensure that a weak portion of that kind has an ultimate tensile stress above a predetermined lower limit.

When the tensile element has been pulled out of the mold, the severed end of the tensile element should desirably seal the passage for the tensile element in the mold and be flush with the latter because this will prevent a formation of any undesired projection of plastic material on the molding due to plastic charge entering the passage.

The process according to the invention will be explained more fully with reference to the accompanying drawings, in which FIG. 1 is a top plan view showing one half of a mold for manufacturing eyeglass bows by the process according to the invention, FIG. 2 is a vertical sectional view showing such mold, FIG. 3 is an enlarged side elevation showing a joint between a metal core and a tensile element and FIG. 4 is a block circuit diagram of the control device for the apparatus shown in FIGS. 1 and 2.

Molds 1 for the manufacture of eyeglass bows are shown in FIGS. 1 and 2 and consist in the conventional manner of two mold halves. Metal cores 2 are placed into said molds 1 and are gripped at one end 3 of each core. For this purpose, two pressure members 4 are provided. As the two mold halves are forced together by suitable clamping jaws 5 of an injection-molding machine, not shown, the pressure members 4 will be forced against the ends 3 of the metal cores 2 and will clamp said cores between them.

To prevent a dislocation of the metal core 2 in the mold 1 during the injection-molding operation, each metal core 2 is integrally joined to a tensile element 6 by a weak portion 7 at that end of the core which is opposite to its gripped end 3. Because the tensile element 6 consists in the illustrated embodiment of an extension of the metal core 2, the weak portion 7 between the tensile element 6 and the metal core 2 constitutes a joint which has a lower ultimate tensile strength than the metal core and the tensile element and particularly constitutes a rated breaking point, which breaks when a tensile stress is applied which exceeds the ultimate tensile strength of the weak portion 7.

The tensile elements 6 extend out of the molds 1 through passages 8 so that a tensile force exerted on a tensile element 6 will subject the metal core 2, which is firmly gripped at one end 3, to tensile stress and, consequently, to a directing force which will effectively prevent a dislocation of the metal core 2 in the mold as the plastic charge is injected.

In the embodiment shown by way of example, the required tensile forces are exerted on the tensile elements 6 by two gripping tongs 9, which can be actuated by respective actuating wedges 10 to clamp each tensile element 6 at that end thereof which protrudes between the gripping jaws of the tongs 9. The actuating wedges 10 can be actuated by actuating cylinders, which are not shown and secured to a yoke 12. The tensile force is exerted on the tensile elements 6 by the yoke 12 to which the gripping tongs 9 are secured. The yoke 12 is connected to a cylinder 13 and can be moved by the cylinder 13 in a direction to stress the metal core 2. The stroke of the yoke 12 is limited by stops 14 in both directions.

When pressure is applied to the cylinder 13 to exert through the intermediary of the yoke 12 and the gripping tongs 9 a tensile force on the tensile elements 6 so as to subject the weak point 7 between the metal core 2 and the tensile element 6 to a tensile stress below its ultimate tensile strength, the metal core 2 will be held against a dislocation by the plastic charge entering the mold 1. For this reason, the plastic charge injected into the mold through the sprue channels 15 cannot move the metal core 2 from its predetermined position. Before the injection is completed, a higher pressure is applied to the cylinder 13 so as to increase the force exerted by it and to subject each weak portion 7 to a tensile stress in excess of its ultimate tensile strength. As a result, the tensile elements 6 are severed from the metal cores 2 at the weak portions 7 and are pulled out of the mold 3. The stop 14 which limits the adjustment of the yoke 12 ensures that when a tensile element 6 has been retracted its severed end will close the passage 8 in the mold 1 and be flush with the latter. This is apparent from FIG. 2. Additional plastic charge is then injected to completely fill the mold. When the tensile element 6 has been severed, the metal core 2 can no longer be dislocated because it is held in position by the plastic charge which almost completely fills the mold.

When the plastic material has hardened, the mold can be opened by a suitable movement of the clamping jaws 5 and the workpiece can then be removed. This removal is facilitated by ejector pins 16, which are forced against the workpiece and lift it out of the mold as the clamping jaws 5 are opened.

In order to ensure a proper sequence of operations, a control system may be provided such as is shown in FIG. 4. Obviously the pneumatic control system shown can be replaced by a hydraulic or electric control system because the nature of the control elements is not essential, provided that they ensure the proper sequence of operations in the manufacture of the eyeglass bows.

To ensure that the metal cores 2 can be stressed when they have been placed in the molds 1, each of the tensile elements 6 joined to the metal cores must be gripped at its end protruding from the mold. This is effected in accordance with FIGS. 1 and 2 by means of gripping tongs 9 but may also be effected by other means. To actuate the wedges 10 for actuating the gripping tongs 9, a pedal-operated pilot valve 17 is opened to apply pressure from a compressed air source 19 to a control valve 18, which is then operated to connect the actuating cylinders 20 for actuating the actuating wedges 10 by a pressure duct 21 to the compressed-air source 19. The pressure thus applied to the cylinders 20 causes the wedges 10 to operate the gripping tongs 9 so that they grip the tensile elements 6. When the mold 1 is now closed, the pressure members 4 grip also that end 3 of the metal core 4 which is not to be covered by plastic material. In this way, a tensile stress can be applied to the metal core 2 between the pressure members 4 and the gripping tongs 9. That tensile stress is automatically applied when the mold has been closed. To that end a Pitot tube 22 is provided, which is connected by a pressure relief valve 23 to the compressed-air source 19. The supply duct 24 and the discharge duct 25 connected to the Pitot tube 22 open into an open space 26, which is gas-tightly closed by one mold half as the mold 1 is closed so that the compressed air which flows from the supply duct 24 into the open air when the space 26 is open will then be fed by the discharge duct 25 to a pilot valve 27. The latter is thus actuated to connect the compressed-air source 19 via a control duct 29 to a control valve 28. As a result, the latter is operated to connect the compressed-air source 19 to the cylinder 13 so that a force is exerted on the yoke 12. The connection between the compressed-air source 19 and the cylinder 13 includes a branch duct 30, which incorporates a pressure relief valve 31, which sufficiently reduces the pressure of the compressed air source 19 so that the tensile forces exerted by the cylinder 13 on the tensile elements 6 will reliably be lower than the tensile forces which would subject the weak portion 7 between the metal core 2 and the tensile element to its ultimate tensile stress. When the metal core 2 has thus been tensioned by the application of pressure to the cylinder 13, the injection can be initiated and a plastic charge can be injected into the mold. Because the metal core 2 is tensioned, it cannot yield to and be deflected out of position by the plastic charge entering the mold. Shortly before the injection is completed, the tensile stress applied to the weak portion 7 must be increased above its ultimate tensile strength so as to separate the joint between the metal core 2 and the tensile element 6 and the tensile element must be pulled out of the mold. For this purpose, a change-over valve 32 is provided, by which the supply duct 33 leading to the cylinder 13 is connected to a branch duct 34, which includes a pressure relief valve 35 providing for the application of a correspondingly higher pressure to the cylinder 13. That duct branch which is not required at a time is automatically closed by a dual check valve 36.

A displacement-dependent control system may be provided to ensure that the change-over valve 32 will be operated in dependence on the level of the plastic charge in the mold 1. This may alternatively be accomplished by a control system which controls the operation of the change-over valve 32 in dependence on the pressure in the mold 1. A particularly simple solution will be obtained if a timer 37 is provided, which after a predetermined time causes the change-over valve 32 to be operated by the application of pressure thereto from the control duct 29 via a connecting duct 38. Because the mold is filled within a predetermined time, the timer 37 can be adjusted without difficulty to such a delay that a higher pressure is applied to the cylinder 13 shortly before the filling operation has been completed. The higher pressure applied to the cylinder 13 causes the tensile element to be severed from the associated metal core 2 and causes the yoke 12 to be retracted as far as is permitted by the stops 14. In this end position the severed ends of the tensile elements 6 seal the passages 8 in the mold 1 and are flush with the latter.

When it is desired to open the mold 1, a control valve 39 is operated, e.g., by a lever or a linkage, to connect the resetting duct 40 to the compressed-air source 19, so that the pressure applied by the resetting duct 40 to the control valves 18 and 28 causes said valves to return to their initial positions shown on the drawing. This resetting is permitted because the pilot valves 17 and 27 are in their initial position. The space 26 communicating with the Pitot tube 22 prevents an application of pressure to the pilot valve 27 via the discharge duct 25.

As the control valve 28 is reset, it causes a resetting of the cylinder 13 and, as a result, of the gripping tongs 9 connected to the yoke 12. The gripping tongs 9 have been opened as a result of the resetting of the control valve 18. The pressure applied to the cylinder 13 so as to move it to its initial position is applied via the duct 41 also to the change-over valve 32. It is apparent that the resetting of the entire control system to its initial position is actually controlled by the control valve 39.

Finally, the joint which constitutes a rated breaking point might be designed to have a predetermined ultimate torsional strength so that the tensile element must be twisted about its axis in order to sever the tensile element 6 from the metal core 2.

What is claimed is:

1. In a process of manufacturing workpieces comprising a metal core embedded in plastic material, wherein the metal core is placed in a mold and gripped at one end and the mold is then filled with a plastic charge, the improvement residing in that that end of the metal core which is opposite to its ends to be gripped is connected to a tensile element by a joint which constitutes a rated breaking point which has a lower ultimate tensile strength than any other portion of said metal core and tensile element, the metal core is placed in the mold so that the tensile element extends out of the mold and is adapted to subject the metal core to tensile stress, during the filling of the mold with the plastic charge until the mold is substantially but less than completely filled with the plastic charge, the metal core is subjected by means of said tensile element to a tensile stress that is lower than the ultimate tensile strength of said rated breaking point, the metal core is subjected by means of said tensile element to a tensile stress in excess of the ultimate tensile strength of said rated breaking point to sever the tensile element from said metal core when the mold is substantially but less than completely filled with the plastic charge, the severed tensile element is pulled out of the mold, and the mold is then completely filled with plastic composition.

2. The improvement as set forth in claim 1 as applied to the manufacture of eyeglass bows.

3. The improvement as set forth in claim 1, wherein the metal core is subjected by means of said tensile element to a tensile stress in excess of the ultimate tensile strength of said rated breaking point to sever the tensile element from said metal core when the latter is entirely embedded in the plastic charge.

4. The improvement as set forth in claim 1, wherein said tensile element and metal core are integrally made and connected by a relatively weak portion.

5. The improvement set forth in claim 4, wherein said relatively weak portion consists of a constricted portion.

6. The improvement as set forth in claim 1, wherein a mold is used which is formed with a passage opening, said metal core is placed in said mold so that said tensile element extends out of the mold through said passage opening, and said tensile element is connected to said metal core in such a manner that when the tensile element has been severed from the metal core that portion of the tensile element which is near the severed end thereof will seal said passage opening and be flush with the inside surface of the mold.

* * * * *